United States Patent
Antol et al.

(10) Patent No.: US 10,909,371 B2
(45) Date of Patent: Feb. 2, 2021

(54) SYSTEM AND METHOD FOR CONTEXTUAL DRIVEN INTELLIGENCE

(71) Applicant: Samsung Electronics Co., Ltd., Suwon-si (KR)

(72) Inventors: Stanislaw Antol, Cupertino, CA (US); Abhijit Bendale, Sunnyvale, CA (US); Simon J. Gibbs, San Jose, CA (US); Won J. Jeon, San Jose, CA (US); Hyun Jae Kang, Santa Clara, CA (US); Jihee Kim, Mountain View, CA (US); Bo Li, San Jose, CA (US); Anthony S. Liot, Cupertino, CA (US); Lu Luo, Mountain View, CA (US); Pranav K. Mistry, Saratoga, CA (US); Zhihan Ying, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/841,157

(22) Filed: Dec. 13, 2017

(65) Prior Publication Data
US 2018/0204059 A1    Jul. 19, 2018

Related U.S. Application Data

(60) Provisional application No. 62/472,497, filed on Mar. 16, 2017, provisional application No. 62/448,325, (Continued)

(51) Int. Cl.
*G06K 9/00*    (2006.01)
*G06N 20/00*    (2019.01)
(Continued)

(52) U.S. Cl.
CPC ...... *G06K 9/00671* (2013.01); *G06F 11/3055* (2013.01); *G06F 11/3433* (2013.01);
(Continued)

(58) Field of Classification Search
None
See application file for complete search history.

(56) References Cited

U.S. PATENT DOCUMENTS 7,383,260 B2    6/2008    Smith, Jr. et al.
7,565,139 B2    7/2009    Neven, Sr. et al.
(Continued)

FOREIGN PATENT DOCUMENTS

KR    10-2009-0090613    8/2009
KR    101191913 B1    10/2012
(Continued)

OTHER PUBLICATIONS

International Search Report and Written Opinion dated Apr. 16, 2018 for International Application PCT/KR2018/000853 from Korean Intellectual Property Office, pp. 1-14, Republic of Korea.
(Continued)

*Primary Examiner* — Chan S Park
*Assistant Examiner* — Elisa M Rice
(74) *Attorney, Agent, or Firm* — Sherman IP LLP; Kenneth L. Sherman; Steven Laut

(57) ABSTRACT

A method includes retrieving, by a device, contextual information based on at least one of an image, the device, user context, or a combination thereof. At least one model is identified from multiple models based on the contextual information and at least one object recognized in an image based on at least one model. At least one icon is displayed at the device. The at least one icon being associated with at least one of an application, a service, or a combination thereof providing additional information.

20 Claims, 13 Drawing Sheets

Related U.S. Application Data filed on Jan. 19, 2017, provisional application No. 62/448,339, filed on Jan. 19, 2017.

(51) Int. Cl.

| | | |
|---|---|---|
| *G06F 11/30* | (2006.01) | |
| *G06F 11/34* | (2006.01) | |
| *G06K 9/32* | (2006.01) | |
| *G06K 9/62* | (2006.01) | |
| *G06K 9/66* | (2006.01) | |
| *G06N 3/08* | (2006.01) | |
| *G06N 5/02* | (2006.01) | |
| *G06T 11/00* | (2006.01) | |
| *G06T 19/00* | (2011.01) | |
| *H04L 29/08* | (2006.01) | |
| *H04L 29/06* | (2006.01) | |
| *G06F 3/14* | (2006.01) | |

(52) U.S. Cl.
CPC ...... *G06F 11/3438* (2013.01); *G06K 9/00221* (2013.01); *G06K 9/3241* (2013.01); *G06K 9/6256* (2013.01); *G06K 9/6262* (2013.01); *G06K 9/6282* (2013.01); *G06K 9/66* (2013.01); *G06N 3/08* (2013.01); *G06N 5/025* (2013.01); *G06N 20/00* (2019.01); *G06T 11/00* (2013.01); *G06T 19/006* (2013.01); *H04L 67/22* (2013.01); *H04L 67/38* (2013.01); *G06F 3/14* (2013.01); *G06K 9/6292* (2013.01)

(56) References Cited

U.S. PATENT DOCUMENTS

| | | | |
|---|---|---|---|
| 7,953,693 B2 | 5/2011 | Smith, Jr. et al. | |
| 8,185,523 B2 | 5/2012 | Lu et al. | |
| 8,229,948 B1 | 7/2012 | Ershov | |
| 8,379,990 B2 | 2/2013 | Nitta | |
| 8,788,517 B2 | 7/2014 | Horvitz et al. | |
| 8,990,199 B1 | 3/2015 | Ramesh et al. | |
| 9,230,172 B2 | 1/2016 | Holzschneider et al. | |
| 9,235,634 B2 | 1/2016 | Georgakis et al. | |
| 9,412,361 B1 | 8/2016 | Geramifard et al. | |
| 9,535,960 B2 | 1/2017 | Guo et al. | |
| 9,565,512 B2 | 2/2017 | Rhoads et al. | |
| 9,573,277 B2 | 2/2017 | Rosen et al. | |
| 9,576,195 B2 | 2/2017 | Na | |
| 9,875,258 B1 | 1/2018 | Hsaio et al. | |
| 9,916,538 B2 | 3/2018 | Zadeh et al. | |
| 10,037,363 B2 | 7/2018 | Chen et al. | |
| 10,235,518 B2* | 3/2019 | Permeh | G06N 20/00 |
| 2005/0076004 A1 | 4/2005 | Yanagisawa et al. | |
| 2006/0031217 A1 | 2/2006 | Smith et al. | |
| 2008/0005067 A1 | 1/2008 | Dumais et al. | |
| 2008/0013940 A1 | 1/2008 | Jung et al. | |
| 2008/0147730 A1 | 6/2008 | Lee et al. | |
| 2008/0168070 A1 | 7/2008 | Naphade et al. | |
| 2009/0245573 A1 | 10/2009 | Saptharishi et al. | |
| 2010/0114855 A1 | 5/2010 | Li et al. | |
| 2011/0085739 A1 | 4/2011 | Zhang et al. | |
| 2011/0276562 A1 | 11/2011 | Madden-Woods et al. | |
| 2011/0320454 A1 | 12/2011 | Hill et al. | |
| 2014/0029806 A1 | 1/2014 | Nihei et al. | |
| 2014/0059458 A1 | 2/2014 | Levien et al. | |
| 2014/0233800 A1 | 8/2014 | Kis et al. | |
| 2014/0253588 A1* | 9/2014 | Mandala | G02B 27/01 345/633 |
| 2015/0026691 A1 | 1/2015 | Rastogi | |
| 2015/0170042 A1 | 6/2015 | Perkowitz et al. | |
| 2015/0213058 A1 | 7/2015 | Ambardekar et al. | |
| 2015/0254510 A1 | 9/2015 | Mckinnon et al. | |
| 2015/0347488 A1* | 12/2015 | Peters | G06F 3/04817 715/765 |
| 2015/0347525 A1 | 12/2015 | Marlow et al. | |
| 2015/0363409 A1 | 12/2015 | Wood et al. | |
| 2015/0363485 A1 | 12/2015 | Bennett et al. | |
| 2015/0363943 A1 | 12/2015 | Yalniz et al. | |
| 2016/0063692 A1* | 3/2016 | Divakaran | G06K 9/6202 382/110 |
| 2016/0070731 A1 | 3/2016 | Chang et al. | |
| 2016/0117862 A1* | 4/2016 | Cardonha | G09G 5/003 345/633 |
| 2016/0171346 A1 | 6/2016 | Han et al. | |
| 2016/0203214 A1 | 7/2016 | Chang et al. | |
| 2016/0217158 A1 | 7/2016 | Watanabe et al. | |
| 2016/0275947 A1 | 9/2016 | Li et al. | |
| 2016/0292507 A1 | 10/2016 | Ghoson et al. | |
| 2016/0379260 A1 | 12/2016 | Balasubramanian et al. | |
| 2018/0005134 A1* | 1/2018 | Kish | G06N 3/063 |
| 2018/0204061 A1 | 7/2018 | Antol et al. | |

FOREIGN PATENT DOCUMENTS

| | | |
|---|---|---|
| KR | 10-2015-0052306 B1 | 4/2015 |
| KR | 20170035506 A | 3/2017 |
| WO | 2011142651 A1 | 11/2011 |

OTHER PUBLICATIONS

International Search Report and Written Opinion dated Apr. 27, 2018 for International Application PCT/KR2018/000738 from Korean Intellectual Property Office, pp. 1-13, Republic of Korea.

Extended European Search Report dated Oct. 29, 2019 for European Application No. 18741395.0 from European Patent Office, pp. 1-10, Munich, Germany.

Extended European Search Report dated Oct. 30, 2019 for European Application No. 18741064.2 from European Patent Office, pp. 1-10, Munich, Germany.

U.S. Non-Final Office Action for U.S. Appl. No. 15/875,393 dated Nov. 29, 2019.

U.S. Final Office Action for U.S. Appl. No. 15/875,393 dated Apr. 16, 2020.

U.S. Advisory Action for U.S. Appl. No. 15/875,393 dated Jun. 15, 2020.

U.S. Notice of Allowance for U.S. Appl. No. 15/875,393 dated Sep. 10, 2020 by Examiner Elisa M. Rice.

* cited by examiner

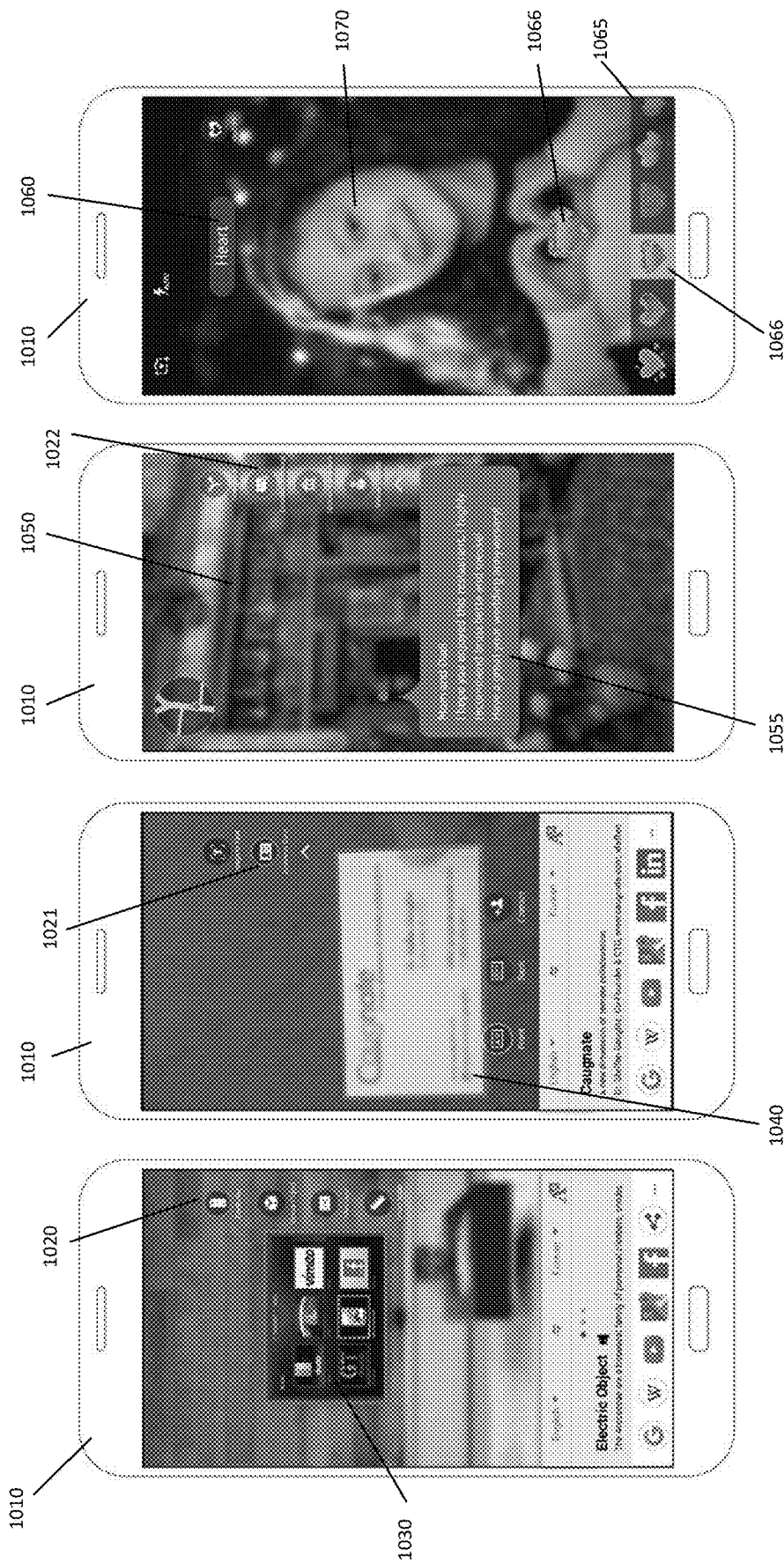

SYSTEM AND METHOD FOR CONTEXTUAL DRIVEN INTELLIGENCE

CROSS REFERENCE TO RELATED APPLICATIONS

This application claims priority from U.S. Provisional Patent Application Ser. No. 62/448,325, filed on Jan. 19, 2017, U.S. Provisional Patent Application Ser. No. 62/448,339, filed on Jan. 19, 2017, U.S. Provisional Patent Application Ser. No. 62/472,497, filed on Mar. 16, 2017, all incorporated herein by reference in their entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to artificial intelligence and machine learning, and in particular, to use of contextual information to enhance computer vision intelligence, such as selecting appropriate models and recommending actions.

BACKGROUND

Electronic devices host a set of physical sensors and software mechanisms that have the ability to detect or estimate many elements of context. Cloud based services can further enrich the context.

There is a research effort to provide intelligent services utilizing such physical sensors, software mechanisms and services.

SUMMARY

One or more embodiments relate to retrieving, by a device, contextual information based on at least one of an image, the device, user context, or a combination thereof. At least one model is identified from multiple models based on the contextual information and at least one object recognized in an image based on at least one model. At least one icon is displayed at the device. The at least one icon being associated with at least one of an application, a service, or a combination thereof providing additional information.

In some embodiments, an electronic device includes a memory configured to store instructions. At least one processor is configured to execute the instructions to: retrieve contextual information based on at least one of an image, the electronic device, user context, or a combination thereof, identify at least one model from a plurality of models based on the contextual information and at least one object recognized in an image based on at least one model, and display at least one icon at the electronic device, the at least one icon being associated with at least one of an application, a service, or a combination thereof providing additional information.

In some embodiments, a non-transitory processor-readable medium that includes a program that when executed by a processor performs a method. The method comprises retrieving, by a device, contextual information based on at least one of an image, the device, user context, or a combination thereof. At least one model is identified from a plurality of models based on the contextual information and at least one object recognized in an image based on at least one model. At least one icon is displayed at the device. The at least one icon being associated with at least one of an application, a service, or a combination thereof providing additional information.

These and other features, aspects and advantages of the one or more embodiments will become understood with reference to the following description, appended claims and accompanying figures.

BRIEF DESCRIPTION OF THE DRAWINGS

FIGS. 10A-D show examples of a user interface for context-based model selection and activation with different layers, according to an embodiment;

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for retrieving, by a device, contextual information based on at least one of an image, the device, user context, or a combination thereof. At least one model (where the term model may refer to a machine learning model, deep learning model, recognition model, etc.) is identified from multiple models based on the contextual information and at least one object recognized in an image based on at least one model. At least one icon is displayed at the device. The at least one icon being associated with at least one of an application, a service, or a combination thereof providing additional information. It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

Figure 1:
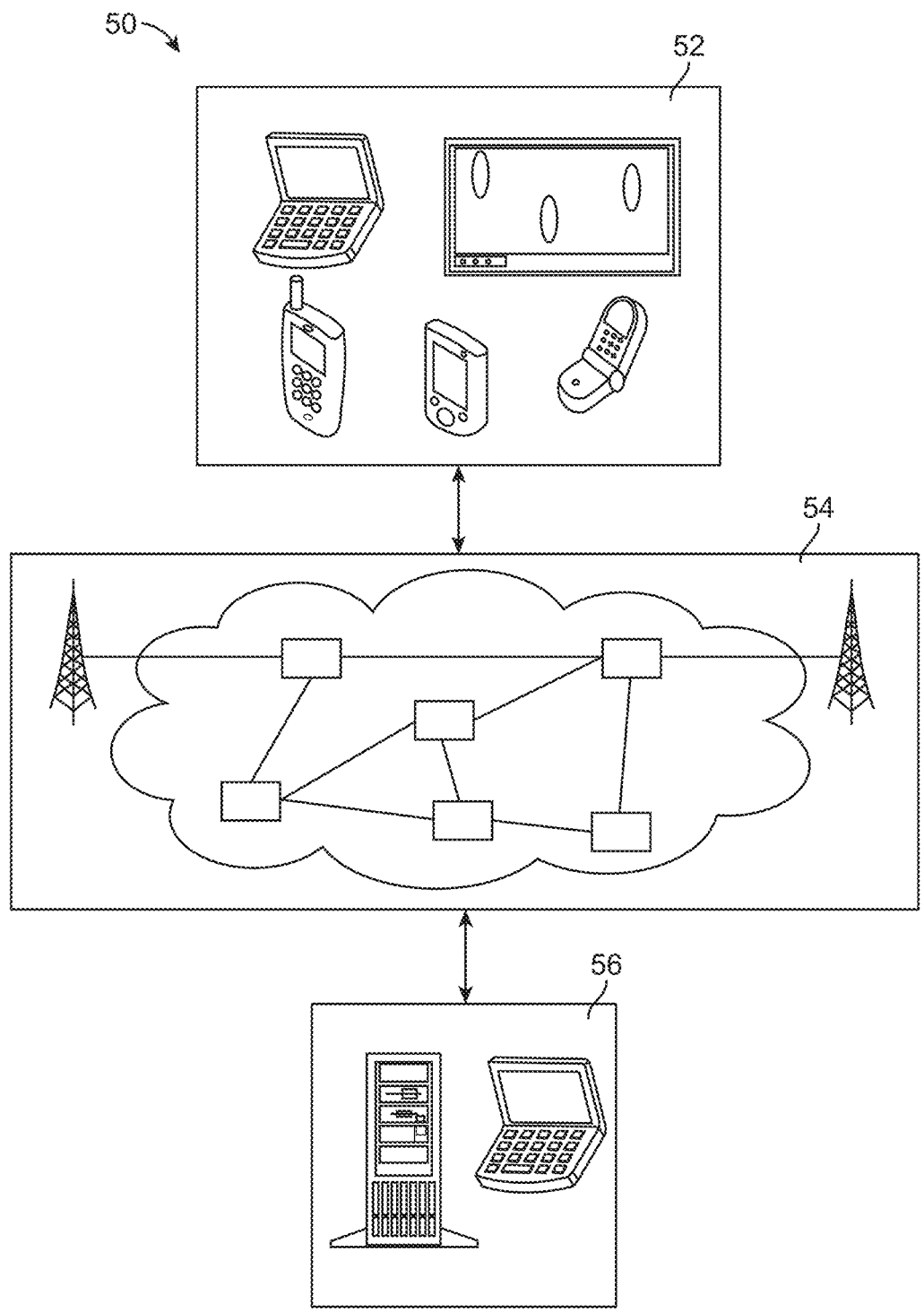
FIG. 1 shows an electronic system for contextual driven intelligence, according to some embodiments.

FIG. 1 shows an electronic system 50 that may be employed with one or more embodiments for contextual driven intelligence. The electronic system 50 includes a first device 52, such as a client or a server, connected to a second device 56, such as a client or server. The first device 52 may communicate with the second device 56 with a communication path 54, such as a wireless or wired network.

In some examples, the first device 52 may be of any of a variety of networked devices. The first device 52 may couple directly or indirectly to the communication path 54 to communicate with the second device 56 or may be a stand-alone device.

For illustrative purposes, the electronic system 50 is described with the first device 52 as a display device, although it is understood that the first device 52 may be a variety of different types of devices. For example, the first device 52 may also be a device for presenting images or a multi-media presentation. A multi-media presentation may be a presentation including sound, a sequence of streaming images or a video feed, or a combination thereof. As an example, the first device 52 may be a smart telephone device, wearable device, tablet device, camera device, video device, portable computing device, kiosk, gaming device, ultra-high definition TV (UHDTV) device, or any other type of display device (e.g., monitor, video panel, heads up display (HUD), etc.).

The second device 56 may be any of a variety of centralized or decentralized computing devices, image or video transmission devices. For example, the second device 56 may be a smart TV, a multimedia computer, a tablet, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 56 may be a signal receiver for receiving broadcast or live stream signals, such as a television receiver, a cable box, a satellite dish receiver, or a web enabled device.

The second device 56 may be centralized in a single room, distributed across different rooms, distributed across different geographical locations, embedded within a telecommunications network, etc. The second device 56 may have a means for coupling with the communication path 54 to communicate with the first device 52.

For illustrative purposes, the electronic system 50 is described with the second device 56 as a computing device, although it is understood that the second device 56 may be different types of devices. Also for illustrative purposes, the electronic system 50 is shown with the second device 56 and the first device 52 as end points of the communication path 54, although it is understood that the electronic system 50 may have a different partition between the first device 52, the second device 56, and the communication path 54. For example, the first device 52, the second device 56, or a combination thereof may also function as part of the communication path 54.

The communication path 54 may be a variety of networks. For example, the communication path 54 may include wireless communication, wired communication, optical, ultrasonic, or the combination thereof. Satellite communication, cellular communication, BLUETOOTH®, Infrared Data Association standard (IrDA), wireless fidelity (WiFi), and worldwide interoperability for microwave access (WiMAX) are examples of wireless communication that may be included in the communication path 54. Ethernet, digital subscriber line (DSL), fiber to the home (FTTH), high-definition multimedia interface (HDMI) cable, and plain old telephone service (POTS) are examples of wired communication that may be included in the communication path 54.

Further, the communication path 54 may traverse a number of network topologies and distances. For example, the communication path 54 may include direct connection, personal area network (PAN), local area network (LAN), metropolitan area network (MAN), wide area network (WAN), a combination thereof, etc.

One or more embodiments may provide processing for context-based model selection and activation of corresponding actions; context-based application launch by "real-world browsing" that directly takes a user from a camera view to an application or a web view associated with the recognized object; context amplification by activating additional models and new sources for visual context, which may in turn lead to further model activation; and additional sources of context by identifying user state and predicting user intent from multiple context sources.

Figure 2:
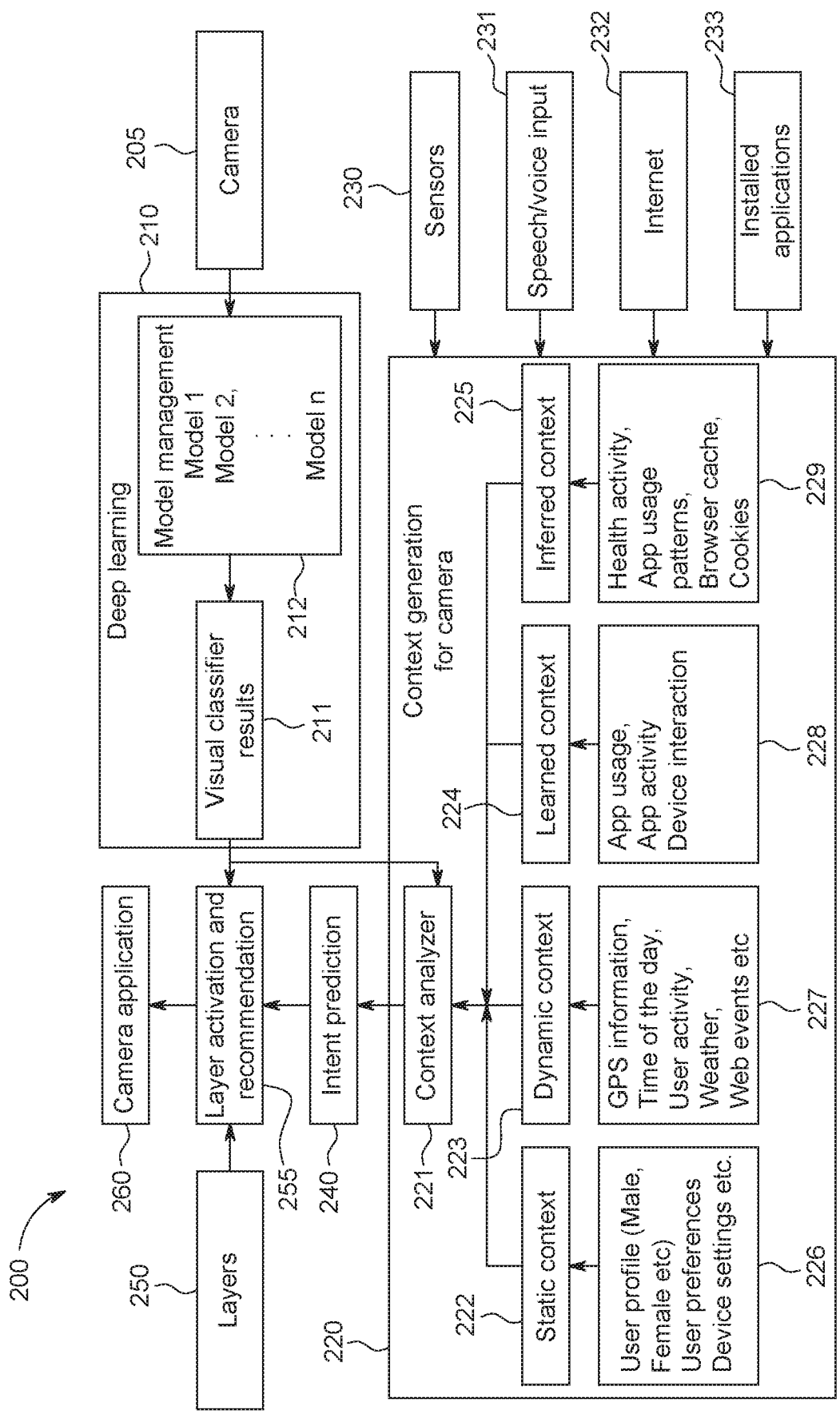
FIG. 2 shows an example architecture for contextual driven intelligence, according to some embodiments.

FIG. 2 shows an example architecture 200 for contextual driven intelligence, according to some embodiments. With advances in computer vision technology and increased computational power of electronic devices, the camera 205 itself is becoming a context sensor. The camera 205 (e.g., an intelligent camera) detects objects and activities in the vicinity of a user. For example, camera imagery may be used to classify the location of the user ("home," "office," "beach," etc.), to detect common objects, and to recognize specific faces and emotions. The intelligent camera 205 derives from advances in computer vision and artificial intelligence that make use of deep learning technology. Deep learning refers to a set of computational techniques for training deep multi-layer neural networks on very large datasets. These trained networks ("models") may then be run on low-cost hardware such as that found in mobile phones. Contextual information may be used to enhance computer vision intelligence, such as selecting appropriate models, recommend actions that are relevant to the user, etc. As described below, reference is made to models, "DL models" or deep learning models, however, these models are referred to for just some embodiments and other types of models may also be used, such as those based on traditional machine learning or computer vision techniques. In one embodiment, the architecture 200 may use a combination of DL models and traditional models.

In one embodiment, architecture 200 includes an electronic device (e.g., a mobile phone device, tablet, wearable device, a smart camera device, mobile computing device, etc.) including a camera 205, DL processing element 210, a context generation processing 220, intent prediction processing 240, layers 250, layer activation and recommendation processing 255, camera application 260, sensors 230, speech/voice input 231, Internet or network connection 232, and installed applications 233.

In one embodiment, the DL processing element 210 may include visual classifier results 211, which are outputs from one or more deep learning engines and corresponding models. Model management processing 212 is responsible for monitoring and selecting/deselecting multiple models (e.g., model 1-N, N being a positive integer), as well as maintaining the lifecycles of each model, including initialization and termination. In one embodiment, the visual classifier results 211 are input to the recommendation processing 255. The context generation processing 220 may include a context analyzer 221 that receives context from static context 222, dynamic context 223, learned context 224, and inferred context 225. The static context 222 receives contextual information from static sources 226, for example, static user profile information, user preferences, device settings, etc. The dynamic context 223 receives contextual information 227, for example, global positioning system (GPS) information, time of day, user activity, weather, web events, etc. The learned context 224 receives contextual information 228, for example, application/app usage, application/app activity, device interaction, etc. The inferred context 225 receives contextual information 229 such as health activity, application/app usage patterns, browser cache, cookies, etc.

In one embodiment, the sensors 230, speech/voice input 231, Internet 232, and installed applications 233 may reside within a same electronic device as the camera 205, or be distributed among multiple electronic devices.

Figure 3:
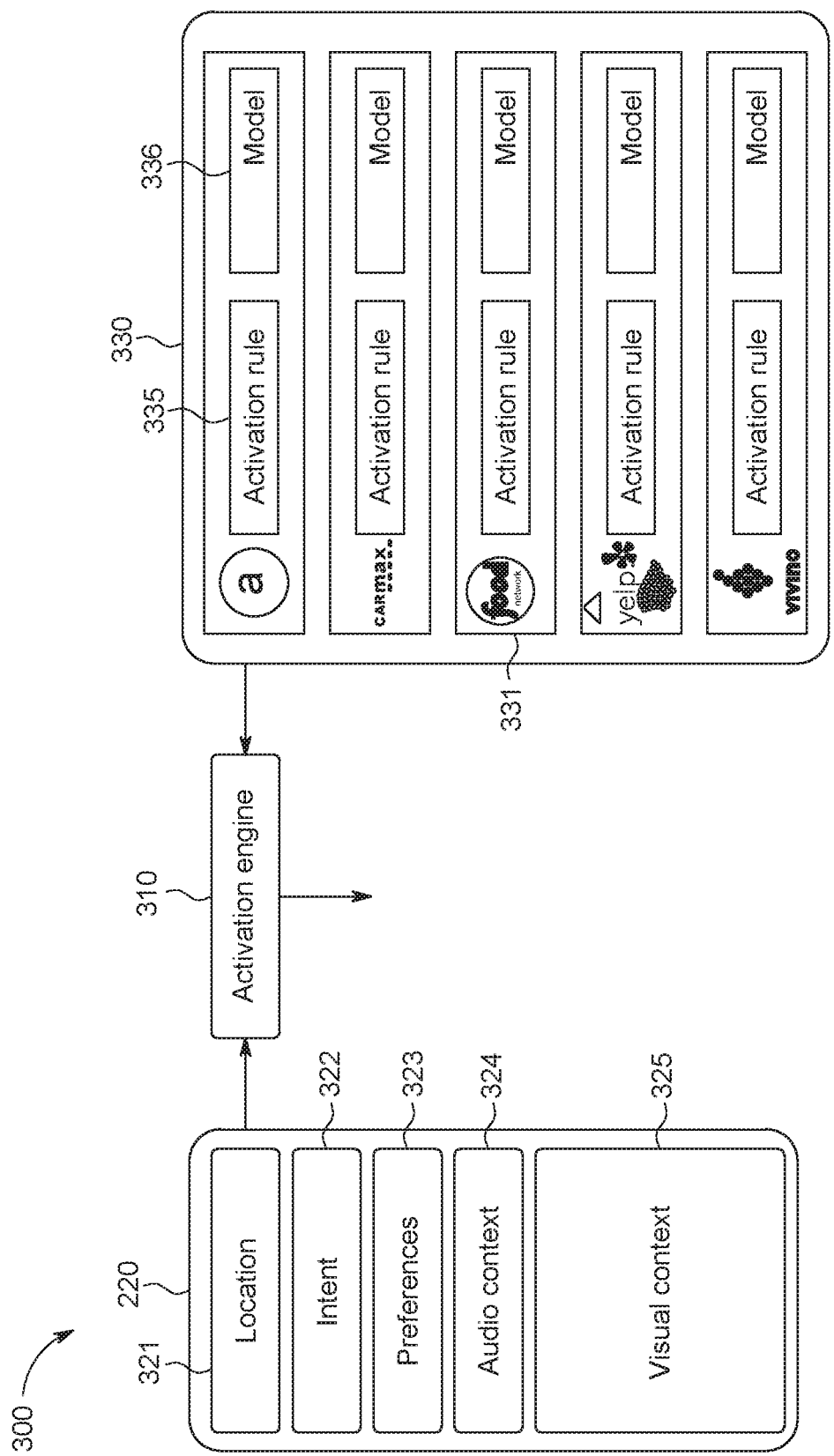
FIG. 3 shows an example diagram for context-based model selection, according to an embodiment.

FIG. 3 shows an example diagram 300 for context-based model selection, according to an embodiment. In one embodiment, an activation engine 310 (of the layer activation and recommendation processing 255, FIG. 2) manages a set of layers/models 330, and receives information from context generation processing 220. Each layer (from layers 250, FIG. 2) comprises a provider (e.g., a mobile application, a web service, or a collection of information such as a database), a visualization 331 (e.g., an icon representing the provider), associated layer activation rules 335 and a model 336 (e.g., ML model, DL model, recognition model, etc.). In one embodiment, layer activation has two parts: model selection: determining when the layer's model 336 (if present) should be started (which means it will receive visual data, such as frames from the camera 205 (FIG. 2) or other sources of imagery); and provider selection: determining when the provider and visualization 331 of the layer should be presented. Once a layer is activated, the layer visualization 331 appears and the user may select the layer. This selection may be via touch (e.g., the user taps on the layer icon on a touchscreen display of an electronic device, (e.g., a smartphone), voice (e.g., the user speaks the layer name) or by other forms of interaction such as pointing (e.g., via a mouse, a pen device, etc.). When the layer is selected, the provider presents information related to the context element (such as a recognized object) that led to activation of the layer.

When large numbers of layers (with associated models) are placed on an electronic device (e.g., device 52, FIG. 1), not all layers can be active at the same time since device resources (screen space, memory, central processor unit (CPU) and power) are limited. Thus, a key problem is selecting what layers/models to activate. One solution is to let the user select—but this puts a burden on the user. Furthermore, this burden grows as the number of layers increases. In one embodiment, another solution is context-based model selection and layer activation, which allows a system running on the electronic device to recommend layer/model activation based on contextual element. In one embodiment, the activation engine 310 is responsible for managing layer activation. A layer's activation rule is used by the activation engine 310 to determine when the layer should be activated. The activation rule can take many forms such as a rule-based system or a classifier built using traditional machine learning techniques.

Example diagram 300 illustrates one embodiment of context-based model selection and layer activation. The context may include, but is not limited to, predicted visual labels (e.g., "computer mouse") from the currently running model(s) plus other forms of context such as location 321, intent 322, user preferences 323, audio context 324 and visual context 325. One example of contextual model selection and layer activation may include: visual label and layer keyword similarity above threshold. In this example, layer activation is triggered when a generic model predicts a visual label similar to a keyword associated with the layer. This layer is therefore activated and its associated specific model 336 is selected. For example, a shopping layer with icon "a" might be activated if some visual label is similar to keywords such as "shopping," "electronics," "books," etc. Techniques for implementing semantic similarity between words or word phrases include distributed word vector models (e.g., word2vec) which convert words into (relatively) low dimensional vectors. Word vector models provide a good job grouping word meaning, thus things such as dot product (sum of element-wise multiplication) can capture similarity between words. For example, suppose the word vector for "computer mouse" is [0.1, −0.9, 0.0], and "electronics" is [0.2, −0.8, −0.1], "food" is [−0.5, 0.1, 0.9], then using the vector dot products, "computer mouse" is more similar to "electronics" (0.74) than "food" (−0.14). Note that for illustrative purposes, three element vectors are used, but in practice much longer vectors are used. It should be noted that generic models are started automatically and kept running. Generic models have a layer activation rule just like the non-generic models. "Objects" (general object classification) and "Scenes" (general scene classification) are examples. The generic models reside in the same place as other models (e.g., model management processing 212, FIG. 2) and layers (layers/models 330, FIG. 3). In the user interface of one embodiment, (e.g., FIGS. 9A-C) the layers are ordered such that non-generic layers appear first (at the top of the list).

Another example of contextual model selection and layer activation may include: visual label confidence above threshold. In this case, layer activation by the activation engine 310 is triggered when a model predicts a visual label with confidence above a certain threshold. For example, the "Food Network" layer could be activated if the "food model" recognizes something with confidence above 90%.

Yet another example of contextual model selection and layer activation may include: visual label in specified set. In this example, layer activation by the activation engine 320 is triggered when a model 336 predicts a visual label, with confidence above a certain threshold, and appearing in a specified set. For example, the "National Geographic" layer could be activated if a model predicts a "tiger" label or a "lion" label.

Still another example of contextual model selection and layer activation may include: matches to other forms of context (e.g., location, intent, user profile). A layer may be activated by the activation engine 320 if other (non-visual) parts of the contextual element match certain values. For example, the "USED CAR SERVICE" layer might be activated if the user is located in a car lot based on GPS data.

Another example of contextual model selection and layer activation may include: combinations of the above examples. Model selection and layer activation by the activation engine 320 may be determined by some logical combination of the above. For example, when the user is at a grocery store and a grocery product is detected; then a layer providing nutritional information may be activated.

In one embodiment, third-parties can bid for keywords, location, etc. to obtain higher visibility on the device. Suppose, for example, a car company "F" has obtained the keyword "car" and provided an F layer that is installed on an electronic device. This means that if the contextual layer activation system with the activation engine 320 is running and a car is recognized then an F icon will appear and the user is one click away from the F web site or mobile application.

In one embodiment, users may customize layer activation. For example, a user may have preferred providers for electronics items, clothing, or restaurant recommendations. One of the challenges in implementing contextual activation is that a process is needed to measure the relevance of a particular layer to the current context. In one embodiment, metrics of semantic similarity between words or word phrases is employed. Some advantages of this approach include: many different information sources (e.g., models 336, context, user intent, etc.) can naturally be described using words; and this approach allows an open vocabulary. Because of the variety of models 336 that may be provided by layers, it is impractical to enforce consistent/limited vocabulary.

Figure 4:
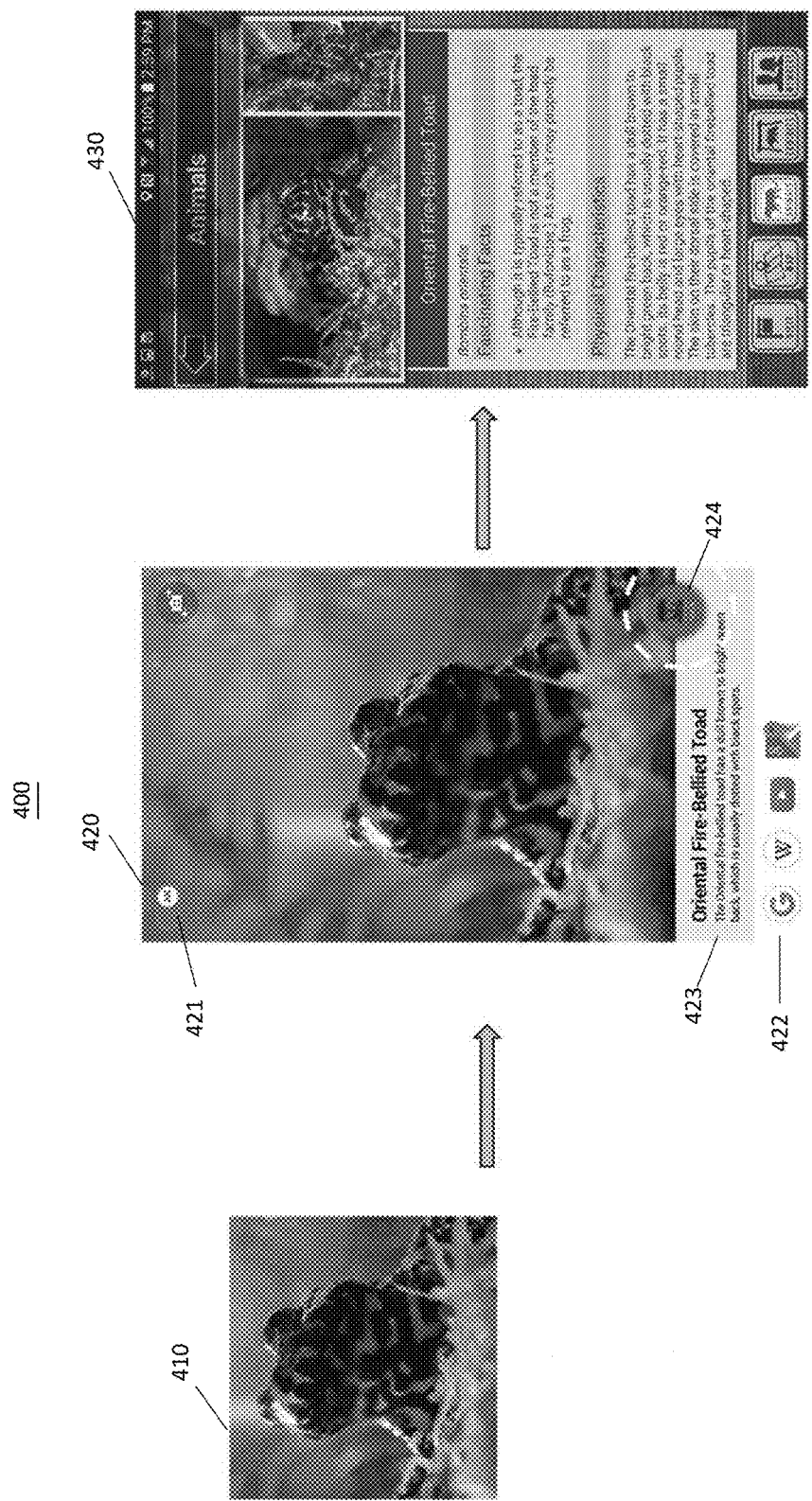
FIG. 4 shows an example use for context-based application launch, according to an embodiment.

FIG. 4 shows an example use 400 for context-based application launch, according to an embodiment. Example use 400 shows an example of model selection and application activation using the architecture 200. For the same object (a frog 410), if the user's current context is identified as "outdoors, at San Francisco Zoo" and intent is determined to be "visiting," then the "SF Zoo" model will be automatically selected by the activation engine 310 (FIG. 3), recognizing the object as "Oriental Fire-Bellied Toad" in the informational "card" 423 and enables launching the SF Zoo application using layer icon 424. In one embodiment, the screen 420 of an electronic device (e.g., a mobile telephone) includes an augmented reality (AR) selection 421 that executes architecture 200 (FIG. 2) and also provides other app selections as icons 422, such as Internet search (e.g., GOOGLE®), dictionary search (e.g., WEBSTER'S®), video search (e.g., YOU TUBE®), a map application (e.g., GOOGLE MAPS®), etc.

In one embodiment, model selection is initiated by the user, such as by tapping on the screen 420 (e.g., a first click) of a camera view captured by camera 205 (FIG. 2), which triggers the contextual layer activation by the activation engine 310. This results in a list of activated layers being shown as icons 422 on the screen. The layers may be ordered based on their relevance to the contextual element, and the most relevant may be expanded to show more detail (e.g., the informational "card" 423 appearing at the bottom of the screen 420).

In one embodiment, ranking of layers may also take into account whether the layer is from a third-party or a built-in "generic" layer. The ranking of layers can be based on various contextual information such as user's profile and preferences, routine behaviors, time, location, and so on. Layer ranking can also integrate commercial considerations, a third-party layer may rank higher if the layer provider has a marketing contract for product promotion. For example, if the user taps on the layer icon 424 appearing in the informational "card" 423 (e.g., a second click), the provider for the layer is launched. In one embodiment, the provider may be an application on the electronic device or a web site 430 accessed via a browser on the electronic device. If the application or web page supports "deep linking" (for example, exposes uniform resource locators (URLs) with parameters for search results), then the launch may take the user directly to an application view or web page associated with the visual that triggered the launch. This form of interaction is referred to as "real-world browsing" since the user simply taps on an object in the camera 205 view on the screen 420 to bring up an application view or web page (e.g., web site 430 web page) related to the object. In another embodiment, the activation engine 310 runs continually and is constantly fed new frames from the camera 205. In this case, layer icons 422 appear spontaneously and only a single click is needed to launch the provider.

Figure 5:
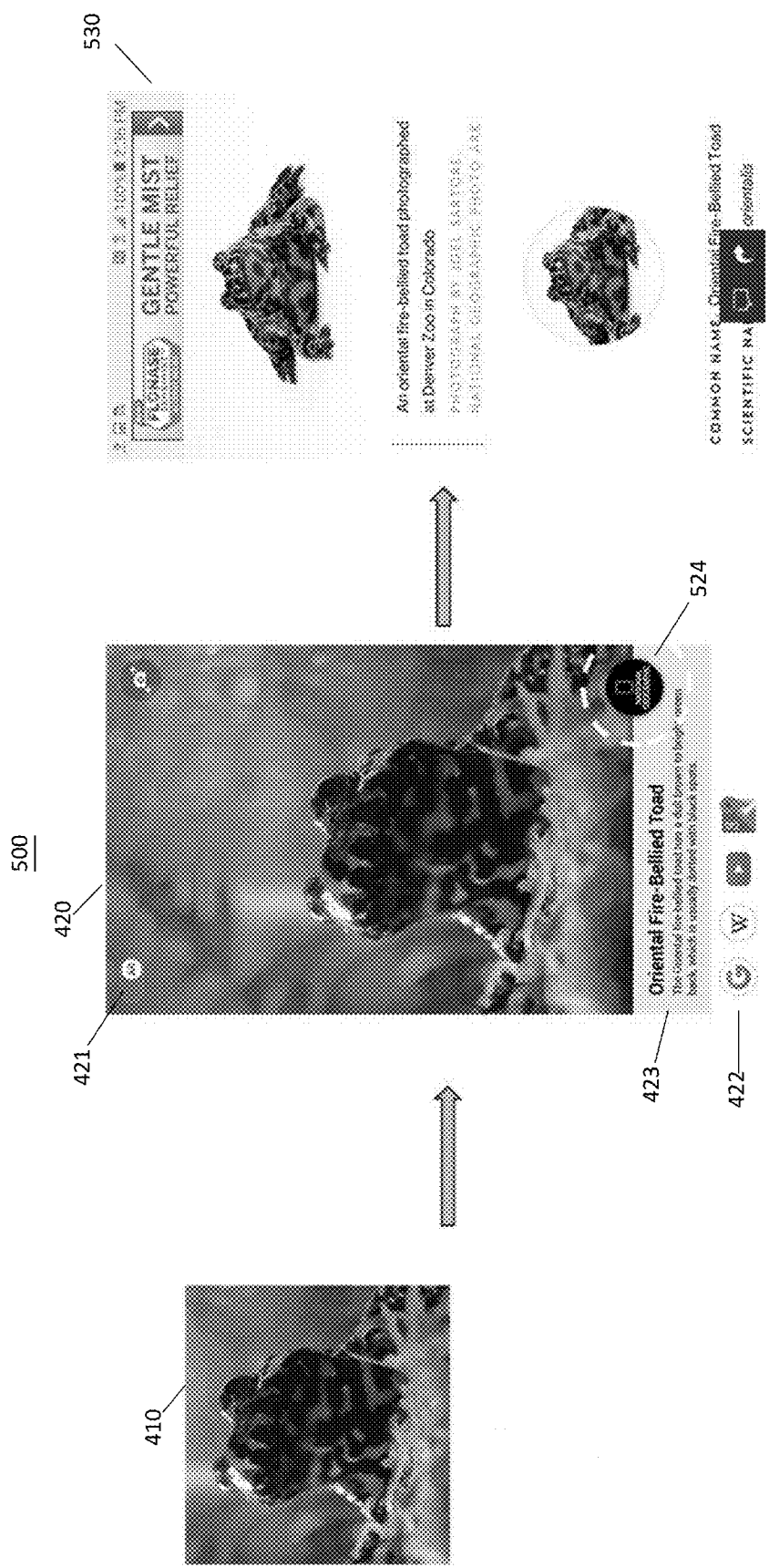
FIG. 5 shows another example use for context-based application launch, according to an embodiment.

FIG. 5 shows another example use 500 for context-based application launch, according to an embodiment. In another context, the architecture 200 (FIG. 2) determines using the context generation processing 220 that the user is "indoors, at library" and "reading." The activation engine 310 (FIG. 3) selects the "NatGeo" model, which recognizes the same type of toad view 410, but shows the "NatGeo" icon 524 that enables launching the National Geographic web page 530.

Figure 6:
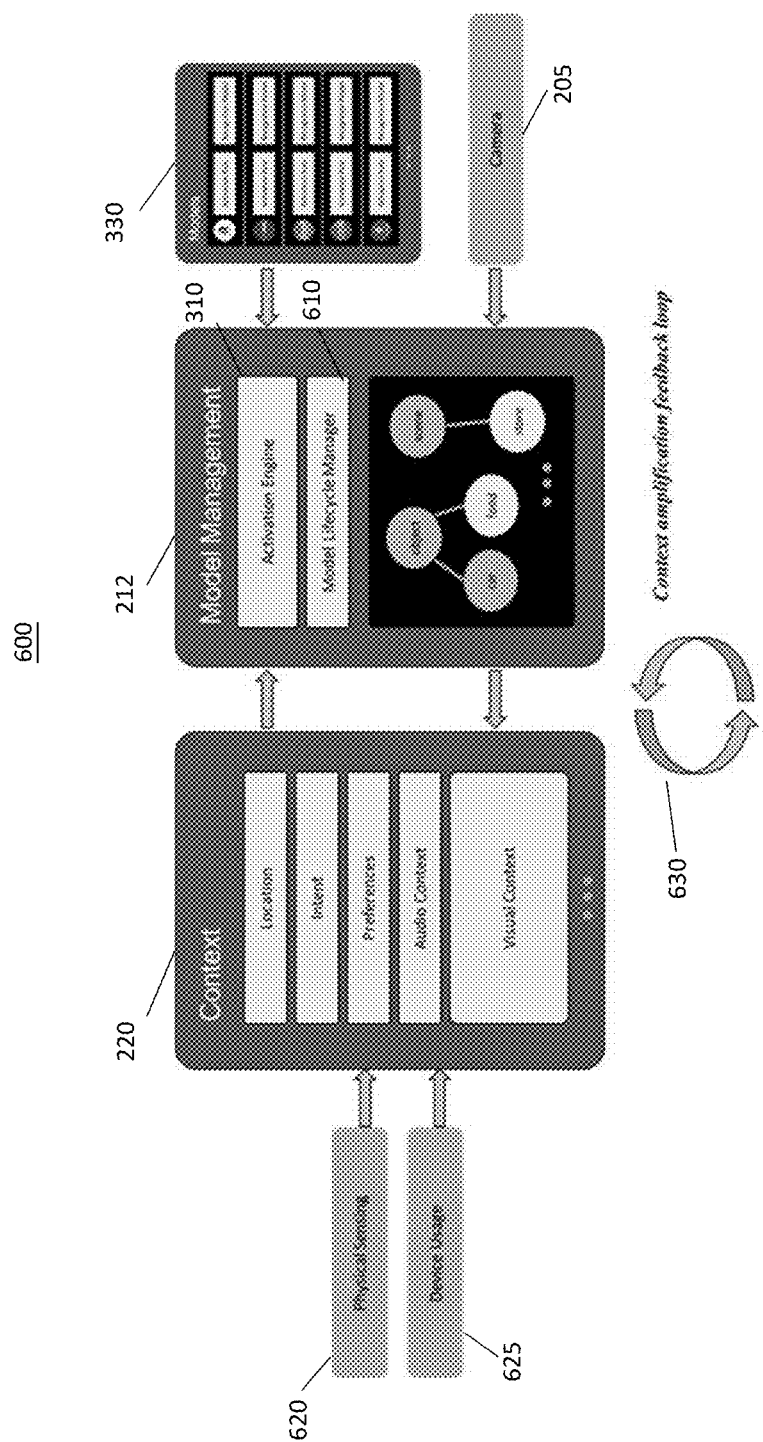
FIG. 6 shows an example of context amplification including a context amplification feedback loop, according to an embodiment.

FIG. 6 shows an example 600 of context amplification including a context amplification feedback loop 630, according to an embodiment. In one embodiment, as layers are activated, additional models are started and new sources for the visual context become active. The visual context becomes enriched by these new sources which may in turn lead to further layer activation. Thus, there is a context amplification feedback loop 630 between the context generation processing 220 and layers/models 330 which has the effect of "amplifying" the context. The example 600 shows a processing flow where physical sensing 620 (using sensors 230) and device usage information 625 are input to the context generation processing 220. Here the "Model Lifecycle Manager" 610 of the model management processing 212 (also including the activation engine 310) receives requests to start models 336 of the layers/models 330 from the activation engine 310. The model lifecycle manager 610 is responsible for initialization, and termination of models. The model lifecycle manager 610 may also play a role in load balancing (e.g., throttling recognition requests sent to models). In one example, currently running models 336 of the layers/models 330 identify objects, visual labels are added to the context, additional layers are activated and further models 336 are activated, and more visuals are identified from newly activated models.

Figure 7:
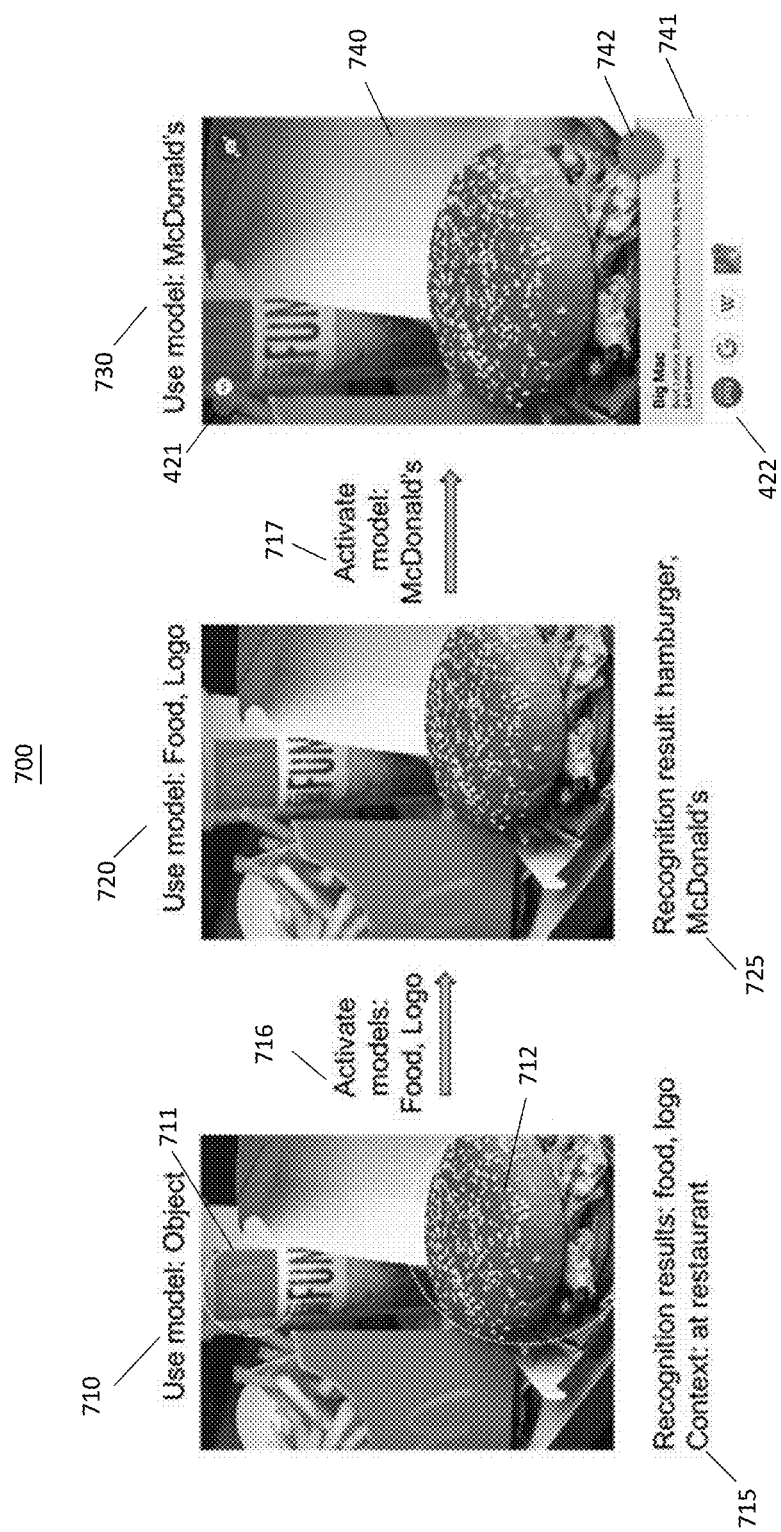
FIG. 7 shows example uses of context amplification, according to an embodiment.

FIG. 7 shows example 700 including exemplary uses 710, 720 and 730 of context amplification, according to an embodiment. In example use 710, suppose a fairly general object recognition model is running and it detects "food" 712 and "logo" 711 visual labels and the contextual element is "at restaurant" 715. This could lead to activation models 716 including a "food" recognition model specialized for objects found in restaurants, and a "logo" model specialized for logo recognition. When these new models are started in use model 720 (food and logo), it might contribute labels 725 such as "hamburger" and "MCDONALD'S®" to the visual context, which in turn lead to further model activation in use 730 (MCDONALDS®) such as MCDONALD'S® model 740 being activated. Activation of MCDONALD'S® model 740 brings up the MCDONALD'S® layer containing UI elements such as application icon of MCDONALD'S® 742 in the information card 741. Clicking on icon 742 will open MCDONALD'S® application if it is already installed on device. Otherwise, clicking on icon 742 can either prompt the user to install MCDONALD'S® application, or open MCDONALD'S® web site to provide further information of the recognized Big Mac™ A clear benefit of this approach is that the architecture 200 (FIG. 2) is adaptive. There is no need for a complicated model manager that decides which models to run and which to stop. Instead the architecture 200 automatically makes these choices based on the context.

In some embodiments, a wide range of sources to model and infer context information are employed. This information is sourced from multiple sources within the electronic device or from the Internet 232 (FIG. 2). In one embodiment, from the electronic device, there may be raw information and processed information from various sensors 230, voice commands/speech input 231 and installed applications 233. In another embodiment, from the Internet 232, information may arise regarding current activities, weather and other data. In yet another embodiment, various sources may be combined to generate multi-modal context, which is used to predict intent (e.g., using intent prediction processing 240, FIG. 2) and state of the user.

Figure 8:
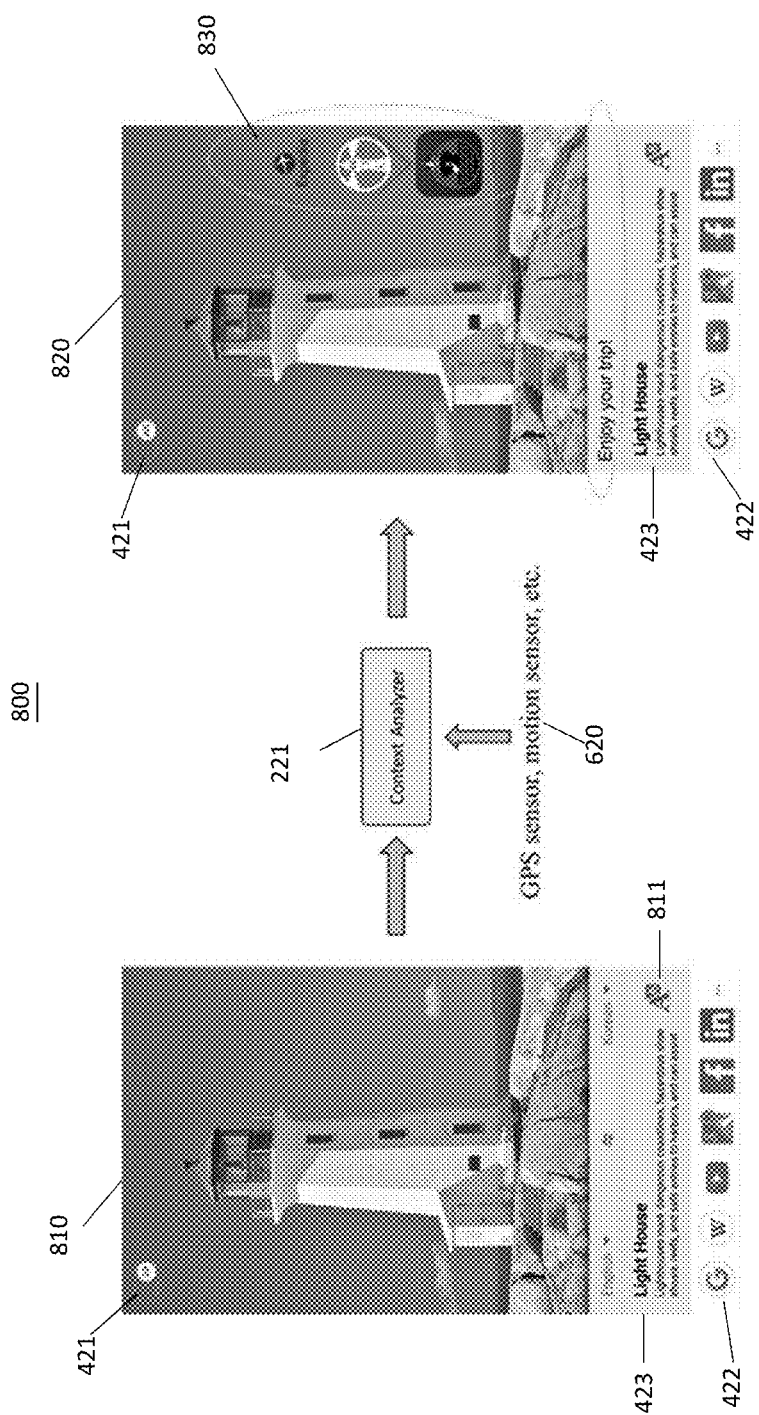
FIG. 8 shows an example use for scene recognition and sensor inputs resulting in context detection and application recommendation, according to an embodiment.

FIG. 8 shows an example use 800 for scene recognition and sensor inputs resulting in context detection and application recommendation, according to an embodiment. In one embodiment, user intent may be inferred by the context analyzer 221 by identifying the (contextual) state of the user. For example, motion sensors may detect a user's current speed (e.g., walking, running, driving, flying, sitting, etc.), and a GPS sensor may detect rapid change in position of the electronic device (e.g., smart phone), leading to activity detection of the user as "walking." This activity is provided to the context analyzer 221 to generate an intent vector, for example "sightseeing" being the current context of the user. Following this process, the intent prediction processing 240 mechanism provides an actionable signal to the activation engine 310 (FIGS. 3, 6). The results of the visual classifiers are combined with an intent prediction mechanism by a context amplification process (FIG. 6), which is fed to the activation engine 310.

In one embodiment, the example 800 includes a generic scene recognition result shown on display 810 of an electronic device, that is fed to the context analyzer 221 of the context generation processing 220 (FIG. 2), along with readings from GPS and other sensors 620. On the display 810 is shown the image of the lighthouse along with the information card 423 including icon 811, and icons 422. The resulting display 820 shows the results of detecting that the user is walking near a light house. This piece of location and motion context information is fed to the activation engine 310, which performs semantic analysis and suggests that the user is most likely doing sightseeing, therefore showing icons 830 for recommending relevant travel apps. As shown, the left side of the context analyzer 221 includes: a visual classifier result: light house, learned/inferred context: outdoors, vacation in near future, and static context: leisure traveler. The right side of the context analyzer 221 includes: intent prediction: trip planning, and recommendations: Travel apps 830.

In one embodiment, the user interface for model selection and layer activation based upon vision recognition and user context can be used to assist selecting the most relevant contents, filtered from the vast amount of information identified by vision intelligence. In one embodiment, objects detected in the center portion of a screen may provide more information than the objects in the boundary portions. For example, the information of center objects may include a detailed description while information of a boundary object may only include keywords or indices. In another embodiment, if one object is zoomed in from the screen, AR information will be provided with more details, whilst other objects that decrease in zoom or disappear from the screen have lower priority and little or no information will be provided.

In another embodiment, objects that gained focus on the screen are provided with detailed information. For example, if it is determined that a user is in a running car, the UI will provide less AR information for outside objects since it is hard for the user to read detailed information with the rapid changes of objects due to the speed of the car.

Figures 9A, 9B, 9C:
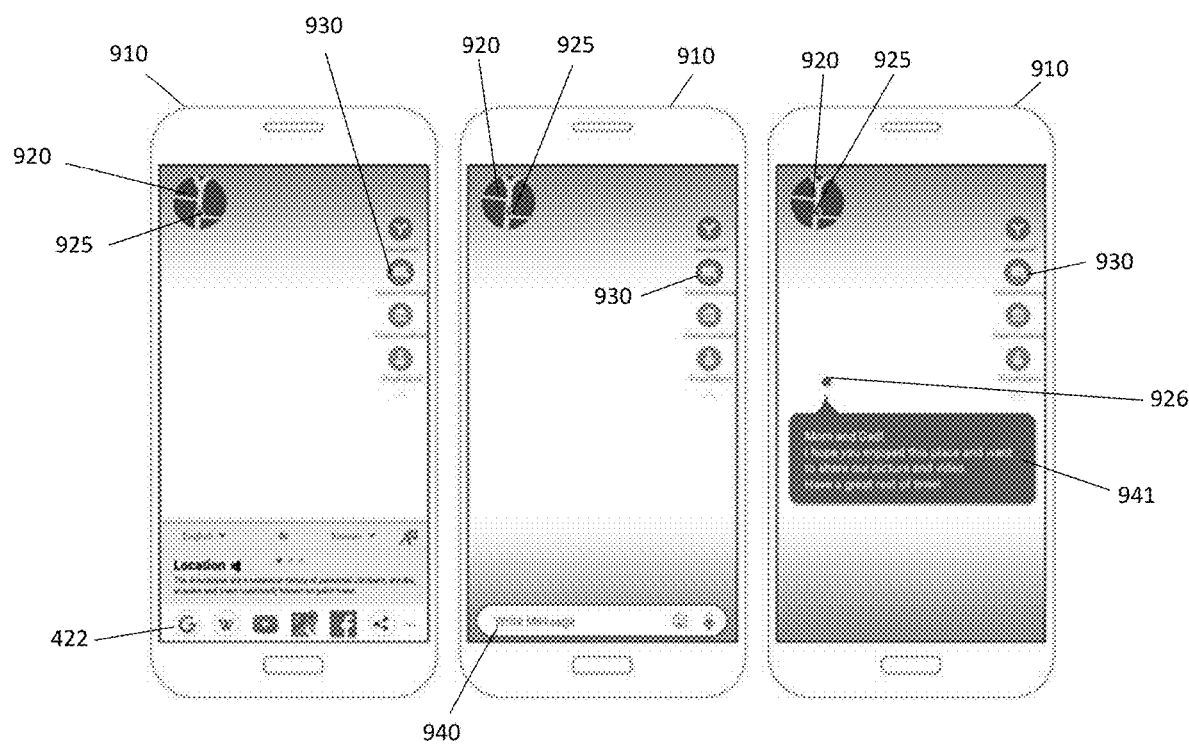
FIGS. 9A-C show examples of a user interface for layer activation, according to an embodiment.

FIGS. 9A-C show examples of a user interface when a landmark recognition layer is activated on an electronic device 910 (e.g., a smart phone), according to an embodiment. In one embodiment, in FIG. 9A the screen of the electronic device 910 shows a map 920 and landmark marker 925 on the upper left-hand side of the screen. After identifying the landmark, a set of related layers are displayed on the upper right-hand side of the screen, including a messaging app 930. For example, with this recognized landmark, the messaging application can be used to share photos of the location. The information card shows location and icons 422 are displayed on the lower portion of the screen. FIG. 9B shows the screen of the electronic device 910 after activation of the messaging app 930 with a message space 940 for entering a message. FIG. 9C shows a written message 941 as being sent on the screen with a landmark identifier 926 associated with the message 941.

FIGS. 10A-D show examples of a user interface with various layers activated, according to an embodiment. FIG. 10A shows an object recognition layer (associated with the generic model) activated for an object captured by the camera (e.g., camera 205, FIG. 2) of electronic device 1010. In this example, a controller icon 1020 is selected and a group of apps 1030 are shown for selection. FIG. 10B shows a text and object recognition layer activated for a captured business card 1040, the layer displays a business card recognition app 1021. FIG. 10C shows a location and place (e.g., a landmark, etc.) recognition layer activated for an image 1050 captured by the camera, the layer displays a messaging app 1022. A message 1055 that will be posted at this location is shown on the image 1050. FIG. 10D shows a sign (e.g., a face-and-gesture) recognition layer activated for an image of a girl 1070 making a heart symbol with her hands. The term "heart" is determined based on the girl's hand gesture 1066 and facial expression 1070. This layer displays a set of heart symbol 1065, and a selection of a specific heart symbol 1066 can be used to add to the girl's image 1070. In this example, the selected heart object 1066 may be placed over the girl's hand gesture location to create an augmented effect on the image.

Figure 11:
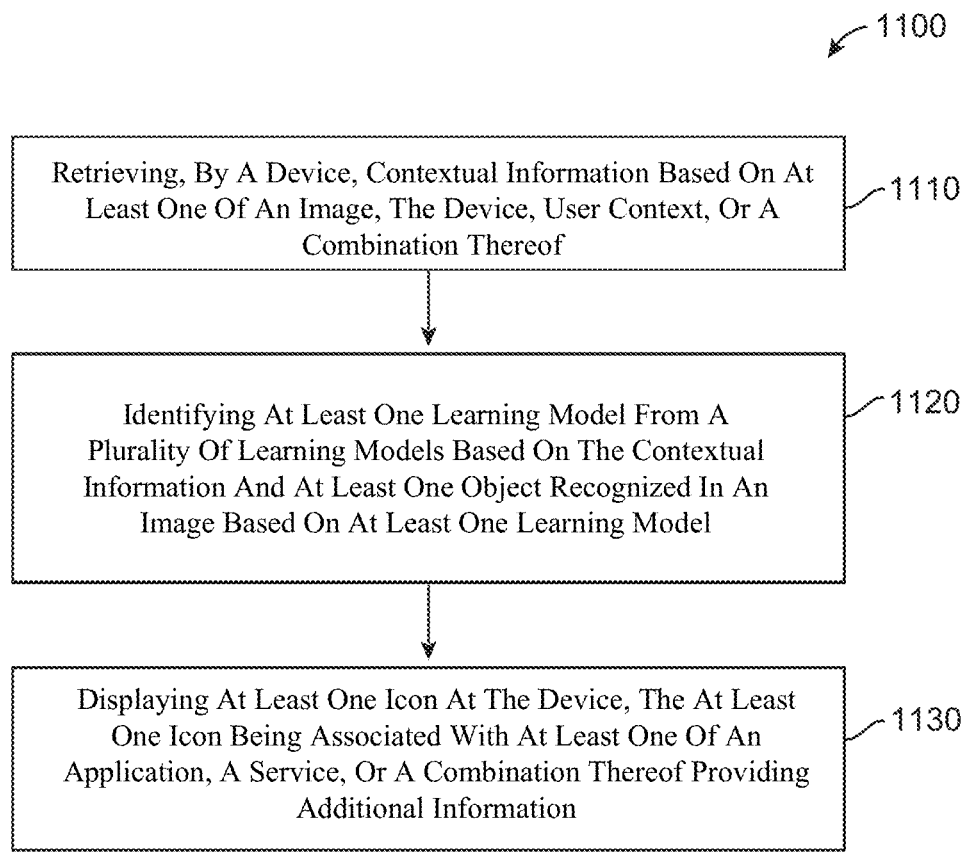
FIG. 11 shows a block diagram for a process for contextual driven intelligence, according to some embodiments.

FIG. 11 shows a block diagram for a process 1100 for contextual driven intelligence, according to some embodiments. In one embodiment, in block 1110 process 1100 provides for retrieving, by a device (e.g., an electronic device 52, FIG. 1, electronic device 910, FIGS. 9A-C, electronic device 1010, FIGS. 10A-D) including architecture 200 (FIG. 2), contextual information based on an image, the device, user context, or a combination thereof. Contextual information includes, but is not limited to: position information obtained using GPS, network-based position, and Wi-Fi data; activity information (e.g., walking, running, sitting, etc.) obtained using motion sensors (e.g. accelerometers, gyro scopes, magnetometers, etc.); audio environment information (e.g. noisy, quiet, etc.) obtained using audio sensors; speech detection and understanding that can detect spoken words and sentences; text analysis that can estimate user sentiment (e.g., angry, happy, etc.), interest, and intent; data analysis that can discover information about the user's preferences and intent (e.g., time, application usage, search history, contacts, etc.) from data collected on device 1010; and cloud services that can further enrich the context (e.g., reverse geocoding that maps from GPS coordinates to addresses). There are many context-aware user intent prediction methods available. In one embodiment, user intent prediction (e.g., using intent prediction processing 240, FIG. 2) can be done by trying to understand the semantic meaning of contextual information, i.e., semantic analysis. One example of semantic analysis that does not require large amount of user data is to use Word Embeddings, where word meanings are represented using vectors and the similarity between two words can be calculated as the distance between the two vectors representing each word. For example, a user context is "walking" results a higher score (shorter distance) with the layer keyword "outdoor" than the layer keyword "restaurant", therefore the "outdoor" layer and its associated models are selected. In block 1120, process 1100 provides for identifying at least one model from many models based on the contextual information and at least one object recognized in an image based on at least one model. In block 1130, process 1000 displays at least one icon at the device. The at least one icon being associated with an application, a service, or a combination thereof providing additional information.

In one embodiment, for process 1100, the contextual information may include: current time, velocity of the device, sensor information, user speech information, textual information, device application information, and location information. In one embodiment, process 1100 may further include determining at least one learning model relevant to the contextual information.

In one embodiment, in process 1100 the at least one model is selected from one or more models based on contextual information to provide the additional information (e.g., from an application, a service, or a combination thereof), and the at least one learning model includes one or more additional models (e.g., models 336 (FIG. 3). In one embodiment, in process 1100 displaying the at least one icon at the device is based on at least one of a ranking of relevance of the model, a source of the model, or a combination thereof.

In one embodiment, process 1100 may further include activating the at least one model based on at least one of the relevance of the at least one model, and receiving input from a user interface of the device. Process 1100 may additionally include displaying a view specific to the at least one model, and enabling an additional model.

In one embodiment, process 1100 may include determining a visual label based on the contextual information. The contextual information may include camera data. Process 1100 may also include determining the relevance of the at least one model based on the visual label via a computation of at least one of: semantic similarity, visual label confidence, appearance in a specified set, or a combination thereof.

In one embodiment, process 1100 may also include inferring the contextual information based on data from an external service and sensors connected to the device. The contextual information further includes intent and state of a user of the device. Process 100 may additionally include filtering user-specific content from AR information to obtain the at least one object. In one embodiment, objects in a center portion of a display of the device provide more AR information than objects in a boundary portion of the display, and zoomed in objects provide more AR information than other objects outside a zoomed in portion of the display.

In one embodiment, process 1100 may include determining the contextual information related to the device being in a moving vehicle, and providing less AR information for objects displayed on the device.

Figure 12:
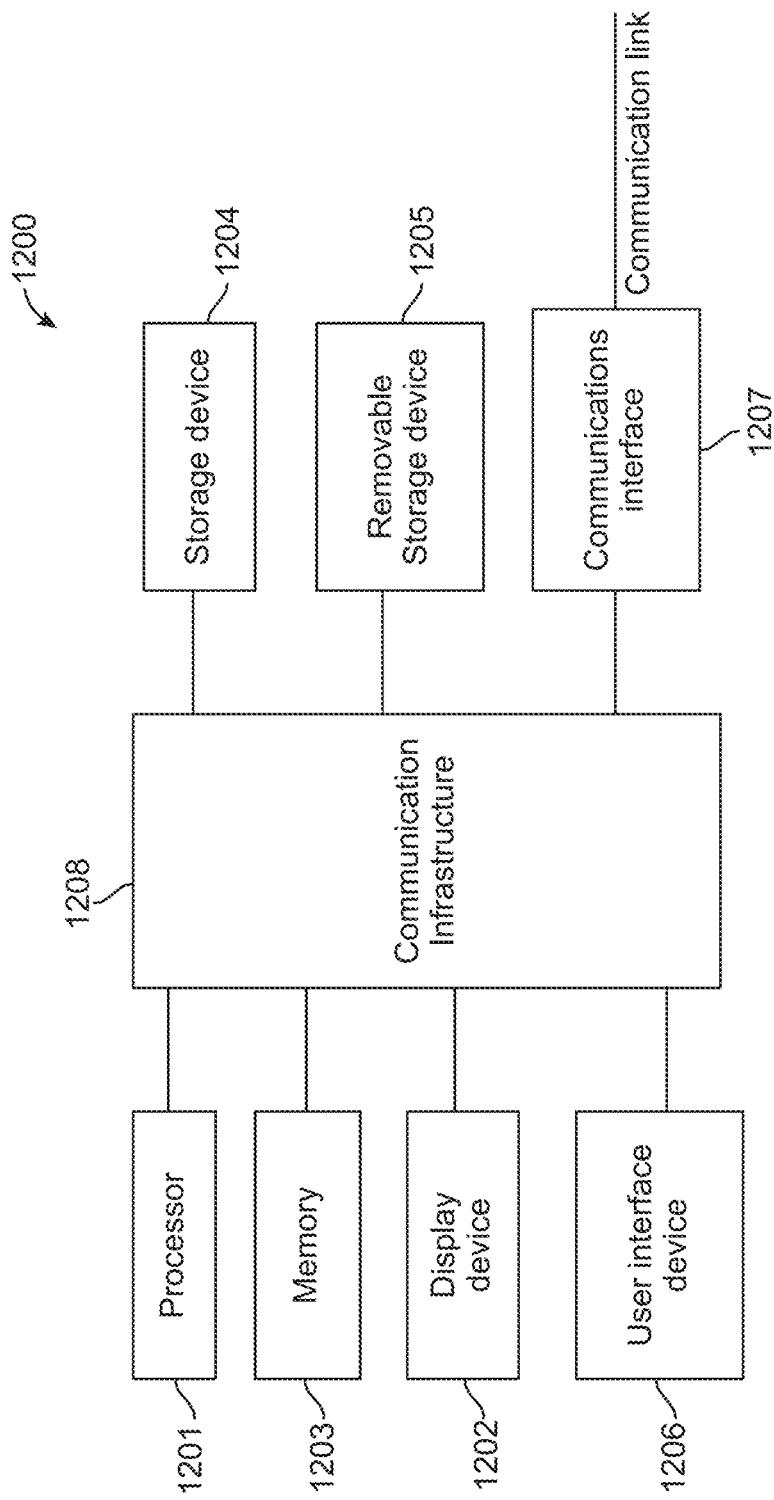
FIG. 12 is an exemplary high-level block diagram showing an information processing system comprising a computer system useful for implementing disclosed embodiments.

FIG. 12 is an exemplary high-level block diagram showing an information processing system comprising a computer system 1200 useful for implementing disclosed embodiments. Computer system 1200 may be incorporated in a device 52, 56, FIG. 1, electronic device 910 (FIGS. 9A-C), electronic device 1010 (FIGS. 10A-D), and include architecture 200 (FIG. 2). The computer system 1200 includes one or more processors 1201, and can further include an electronic display device 1202 (for displaying video, graphics, text, and other data), a main memory 1203 (e.g., random access memory (RAM)), storage device 1204 (e.g., hard disk drive), removable storage device 1205 (e.g., removable storage drive, removable memory device, a magnetic tape drive, optical disk drive, computer readable medium having stored therein computer software and/or data), user interface device 1206 (e.g., keyboard, touch screen, keypad, pointing device), and a communication interface 1207 (e.g., modem, a network interface (such as an Ethernet card), a communications port, or a PCMCIA slot and card). The communication interface 1207 allows software and data to be transferred between the computer system and external devices (e.g., over communication path 54, FIG. 1). The system 1200 further includes a communications infrastructure 1208 (e.g., a communications bus, cross-over bar, or network) to which the aforementioned devices/processors 1201 through 1207 are connected.

In one embodiment, the main memory 1203, storage device 1204 and removable storage device 1205, each by themselves or in any combination, may store instructions for the embodiments described above that may be executed by the one or more processors 1201.

Information transferred via communications interface 1207 may be in the form of signals such as electronic, electromagnetic, optical, or other signals capable of being received by communications interface 1207, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In some embodiments, processing instructions for example 300 (FIG. 3), example 600 (FIG. 6), and example 800 (FIG. 8) and processing instructions for process 1100 (FIG. 11) may be stored as program instructions on the memory 1203, storage device 1204 and the removable storage device 1205 for execution by the processor 1201.

Figure 13:
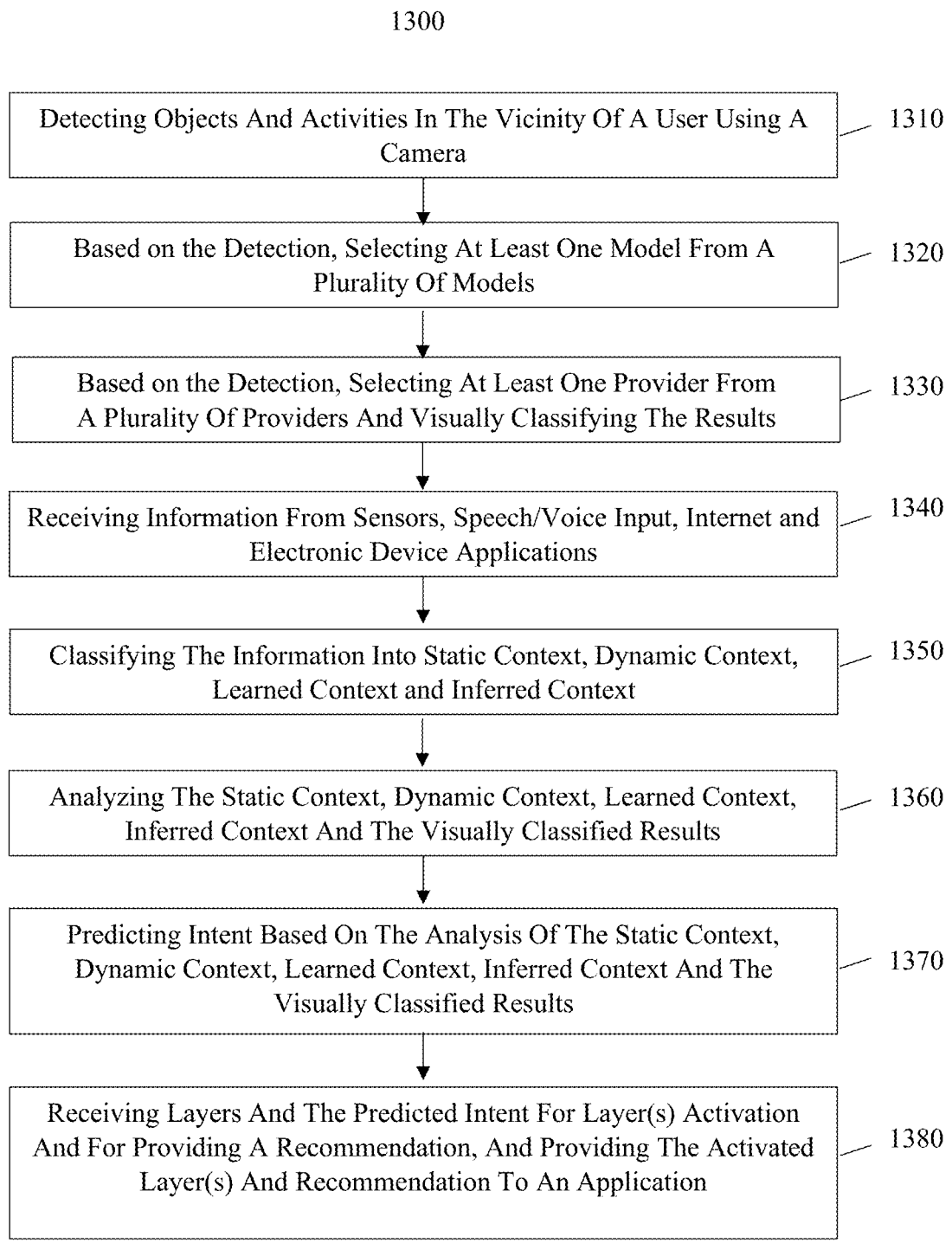
FIG. 13 shows a block diagram for a process for context-based model selection and activation, according to some embodiments.

FIG. 13 shows a block diagram for a process 1300 for context-based model selection and activation, according to some embodiments. In block 1310, objects and activities are detected in the vicinity of a user using a camera (e.g., camera 205, FIG. 2). In block 1320, based on the detection of objects and activities, process 1300 selects at least one model (e.g., a model 336, FIG. 3) from multiple models (e.g., using model management processing 212). In block 1330, also based on the detection, at least one provider (e.g., a mobile application, a web service, or a collection of information such as a database) is selected from multiple providers and the results are visually classified (e.g., using visual classifier results 211 and the activation engine 310). In block 1340, information is received from sensors (e.g., sensors 230), speech/voice input (e.g., speech/voice input 231), Internet (e.g., Internet 232) and electronic device applications (e.g., installed applications 233). In block 1350, the information received in block 1340 is classified (e.g., by context generation processing 220) into static context (e.g., static context 222), dynamic context (e.g., dynamic context 223), learned context (e.g., learned context 224) and inferred context (e.g., inferred context 225). In block 1360, the static context, dynamic context, learned context, inferred context and the visually classified results are analyzed (e.g., by the context analyzer 221). In block 1370, intent is predicted (e.g., using the intent prediction processing 240) based on the analysis of the static context, dynamic context, learned context, inferred context and the visually classified results. In block 1380, process 1300 provides for receiving layers (e.g., layers 250) and the predicted intent (e.g., from the intent prediction processing 240) for layer(s) activation and for providing a recommendation (e.g., using layer activation and recommendation processing 255, the activation engine 310), and providing the activated layer(s) and recommendation to an application (e.g., camera application 260).

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software processor/process or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "processor" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a process, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiments that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method, comprising:
    retrieving, by a device, contextual information based on at least one of an image, the device, user context, or a combination thereof;
    predicting a visual label, and including the predicted visual label with the contextual information;
    detecting user activity based on sensor information;
    generating a state of a user of the device based on the detected user activity;
    identifying two or more models from a plurality of learning models from different sources based on the contextual information, the state of the user of the device and at least one object recognized in an image based on at least one visual recognition model; and
    displaying at least one icon at the device, the at least one icon being associated with at least one of an application, a service, or a combination thereof providing additional information.

2. The method of claim 1, wherein the contextual information comprises at least one of: current time, velocity of the device, the sensor information, user speech information, textual information, device application information, or location information, and the two or more models each comprises at least one of a machine model, a deep learning model, an object recognition model, or a generic model.

3. The method of claim 2, wherein a particular model is selected from the two or more models, the particular model assists to provide the additional information; and the generic model predicts the predicted visual label based on similarity to a keyword associated with the particular model.

4. The method of claim 1, wherein displaying the at least one icon at the device is based on at least one of a ranking of relevance of each of the two or more models, a source of each of the two or more models, or a combination thereof, and the sensor information comprises current speed and change of position of the device.

5. The method of claim 1, further comprising:
    activating the two or more models based on at least one of relevance of each of the two or more models, input from a user interface of the device, or a combination thereof.

6. The method of claim 1, further comprising:
    displaying a view specific to a particular one of the two or more models; and
    enabling an additional model.

7. The method of claim 6, wherein the contextual information includes camera data.

8. The method of claim 7, further comprising:
    determining the relevance of the two or more models based on the predicted visual label via a computation of at least one of: semantic similarity, predicted visual label confidence, appearance in a specified set, or a combination thereof.

9. The method of claim 2, further comprising:
    inferring the contextual information based on data from an external service and sensors coupled to the device, wherein the contextual information further includes intent and the state of the user of the device.

10. The method of claim 2, further comprising:
    determining the contextual information related to the device being in a moving vehicle, and providing less augmented reality (AR) information for objects displayed on the device.

11. An electronic device comprising:
a memory configured to store instructions;
at least one processor configured to execute the instructions to:
retrieve contextual information based on at least one of an image, the electronic device, user context, or a combination thereof;
predict a visual label, and include the predicted visual label with the contextual information;
detect user activity based on sensor information;
generate a state of a user of the electronic device based on the detected user activity;
identify two or more models from a plurality of learning models from different sources based on the contextual information, the state of the user of the electronic device and at least one object recognized in an image based on at least one visual recognition model; and
display at least one icon at the electronic device, the at least one icon being associated with at least one of an application, a service, or a combination thereof providing additional information.

12. The electronic device of claim 11, wherein:
the contextual information comprises at least one of: current time, velocity of the device, the sensor information, user speech information, textual information, device application information, or location information;
a particular model is selected from the two or more models, the particular model assists to provide the additional information, and the particular model comprises one or more object recognition models;
displaying the at least one icon at the electronic device is based on at least one of a ranking of relevance of each of the two or more-models, a source of each of the two or more models, or a combination thereof;
the sensor information comprises current speed and change of position of the electronic device;
each of the two or more models comprises at least one of a machine model, a deep learning model, an object recognition model, or a generic model; and
the generic model predicts the predicted visual label based on similarity to a keyword associated with the particular model.

13. The electronic device of claim 12, wherein:
the at least one processor is further configured to execute the instructions to:
activate the two or more models based on at least one of relevance of each of the two or more models, input from a user interface of the electronic device, or a combination thereof;
displaying a view specific to the particular model;
enable an additional model; and
determine the relevance of the two or more models based on the predicted visual label via a computation of at least one of: semantic similarity, predicted visual label confidence, appearance in a specified set, or a combination thereof; and
the contextual information includes camera data.

14. The electronic device of claim 12, wherein the at least one processor is further configured to execute the instructions to:
infer the contextual information based on data from an external service and sensors coupled to the electronic device, wherein the contextual information further includes intent and the state of the user of the electronic device.

15. The electronic device of claim 12, wherein the at least one processor is further configured to execute the instructions to:
determine the contextual information related to the electronic device being in a moving vehicle, and providing less augmented reality (AR) information for objects displayed on the electronic device.

16. A non-transitory processor-readable medium that includes a program that when executed by a processor performs a method comprising:
retrieving, by a device, contextual information based on at least one of an image, the device, user context, or a combination thereof;
predicting a visual label, and including the predicted visual label with the contextual information;
detecting user activity based on sensor information;
generating a state of a user of the device based on the detected user activity;
identifying two or more models from a plurality of learning models from different sources based on the contextual information, the state of the user of the device and at least one object recognized in an image based on at least one visual recognition model; and
displaying at least one icon at the device, the at least one icon being associated with at least one of an application, a service, or a combination thereof providing additional information.

17. The non-transitory processor-readable medium of claim 16, wherein:
the contextual information comprises at least one of: current time, velocity of the device, the sensor information, user speech information, textual information, device application information, or location information;
a particular model is selected from the two or more models, and the particular model assists to provide the additional information;
displaying the at least one icon at the device is based on at least one of a ranking of relevance of each of the two or more models, a source of each of the two or more models, or a combination thereof;
the sensor information comprises current speed and change of position of the device;
each of the two or more models comprises at least one of a machine model, a deep learning model, an object recognition model, or a generic model; and
the generic model predicts the predicted visual label based on similarity to a keyword associated with the particular model.

18. The non-transitory processor-readable medium of claim 16, wherein:
the method further comprises:
activating the two or more models based on at least one of the relevance of each of the two or more models, receiving input from a user interface of the device, or a combination thereof;
displaying a view specific to a particular one of the two or more models;
enabling an additional model; and
determining the relevance of the two or more models based on the predicted visual label via a computation of at least one of: semantic similarity, predicted visual label confidence, appearance in a specified set, or a combination thereof; and
the contextual information includes camera data.

19. The non-transitory processor-readable medium of claim 17, wherein the method further comprises:

inferring the contextual information based on data from an external service and sensors coupled to the device, wherein the contextual information further includes intent and the state of the user of the device.

20. The non-transitory processor-readable medium of claim 17, wherein the method further comprises:
determining the contextual information related to the device being in a moving vehicle, and providing less augmented reality (AR) information for objects displayed on the device.

\* \* \* \* \*